(12) United States Patent
Hunter (10) Patent No.: US 7,535,405 B2
(45) Date of Patent: May 19, 2009

(54) METHOD AND APPARATUS FOR A MULTIFUNCTION RADIO

(75) Inventor: Jeffrey K. Hunter, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 668 days.

(21) Appl. No.: 11/363,620

(22) Filed: Feb. 28, 2006

(65) Prior Publication Data

US 2007/0200741 A1    Aug. 30, 2007

(51) Int. Cl.
*G01S 13/74* (2006.01)
(52) U.S. Cl. .............................. 342/47; 342/30; 342/36; 342/52; 342/57
(58) Field of Classification Search ................. 342/29, 342/30, 36, 47, 52, 57, 195; 455/132
See application file for complete search history.

(56) References Cited

U.S. PATENT DOCUMENTS

| | | | | |
|---|---|---|---|---|
| 5,712,628 | A * | 1/1998 | Phillips et al. | 340/10.51 |
| 5,715,012 | A * | 2/1998 | Patel et al. | 348/555 |
| 5,751,762 | A * | 5/1998 | Dent | 375/131 |
| 5,909,193 | A * | 6/1999 | Phillips et al. | 342/410 |
| 2004/0102172 | A1 * | 5/2004 | Hendin | 455/302 |
| 2007/0200741 | A1 * | 8/2007 | Hunter | 341/126 |

OTHER PUBLICATIONS

"A novel method for down-conversion of multiple bandpass signals", Mahajan, A.; Agarwal, M.; Chaturvedi, A.K. Wireless Communications, IEEE Transactions on vol. 5, Issue 2, Feb. 2006 pp. 427-434.*
"80-MHz bandpass ΔΣ modulators for multimode digital IF receivers", Salo, T.O.; Lindfors, S.J.; Hollman, T.M.; Jarvinen, J.A.M.; Halonen, K.A.I. Solid-State Circuits, IEEE Journal of vol. 38, Issue 3, Mar. 2003 Ps: 464-474.*

* cited by examiner

*Primary Examiner*—John B Sotomayor
(74) *Attorney, Agent, or Firm*—Fogg & Powers LLC (57) ABSTRACT

A multifunction radio for receiving radio signals from and sending transmissions to multiple radio systems comprises an antenna and a transmit/receive switch coupled to the antenna. The radio further comprises a receiver section coupled to the transmit/receive switch and configured to receive radio signals from one or more multiple radio systems. The receiver section includes a digital downconverter configured to digitally downconvert radio signals sent from one or more of the multiple radio systems and a digital signal processor coupled to the digital downconverter for processing the downconverted signals. A transmitter section is coupled to the transmit/receive switch and configured to generate a transmission signal for reception by one or more of the multiple radio systems.

20 Claims, 8 Drawing Sheets

METHOD AND APPARATUS FOR A MULTIFUNCTION RADIO

FIELD OF THE INVENTION

The present invention generally relates to the field of avionic communication systems and, more particularly, to a method and apparatus for a multifunction radio.

BACKGROUND OF THE INVENTION

Modern aircraft rely on multiple radio systems to provide information to the pilot. For example, an aircraft may include radio systems such as distance measuring equipment (DME), transponder system equipment including the air traffic control radar beacon system (ATCRBS) and Mode-S systems, and automatic dependence surveillance-broadcast (ADS-B) system equipment such as universal access transceivers (UAT), 1090 MHz extended squitters and UHF digital link (VDL) Mode 4.

Distance measuring equipment (DME) is used to determine the distance between an aircraft and a ground station. The transmitter for DME operates in the 978-1212 MHz range. The transmitter sends out narrow pulses that are received by the ground station, which returns a reply pulse transmission. The reply pulses are received by the DME receiver which calculates distance to the ground station by the elapsed time between the sending of the initial pulse to reception of the reply pulse.

In transponder systems, an interrogation signal is received at a transceiver on the aircraft and a reply to the interrogation signal is sent to the entity that sent the interrogation signal, such as a ground station. One transponder system is the ATCRBS. The ATCRBS is designed to send, in reply to an interrogation signal, information from an aircraft regarding identification of the aircraft and the altitude of the aircraft. In operation, an aircraft transponder, which includes a transceiver, receives an interrogation signal sent at a frequency of 1030 MHz. The interrogation signal is typically received at regular intervals from a ground station. After receiving the interrogation signal, the transponder determines a response and transmits a reply. In one embodiment, the reply comprises an identification of the aircraft transmitted as a series of timed pulses. The ground station decodes the reply to obtain the identification of the aircraft. Also, the ground station can calculate the range to the aircraft based on the round trip time between the sending of the interrogation pulse and the reception of the reply. The altitude of the aircraft can be determined based on the direction the antenna of the ground station was facing when the reply was received.

Another type of transponders are Mode-S transponders. Mode-S transponders operate on the same frequency as ATCRBS transponders but represent a significant improvement over older transponder systems in that interrogations can be sent to specific aircraft.

ADS-B system equipment on an aircraft sends out messages without first receiving an interrogation. These messages can be received by other aircraft and by ground station devices. ADS-B systems can periodically broadcast the aircraft's altitude, velocity and other information. In the United States two different ways of implementing ADS-B have been approved by the Federal Aviation Authority: 1090 MHz Mode-S extended squitters (ES) and universal access transceivers (UAT). 1090 MHZ ES have been chosen for use in commercial aircraft and UAT have been chosen for use in general aviation applications.

In a 1090 MHz ES system a 1090 transmitter can be used to periodically transmit ES messages. ES messages from other 1090 MHz systems can be received by the 1090 MHz system. The ES message can comprise such information as position, velocity and heading. UAT systems broadcast messages at 978 MHz (in the U.S.) and receive messages from other UAT systems at the same frequency. UAT messages can comprise information such as that sent in 1090 MHz ES messages, as well as other information, such as traffic information from other aircraft and flight information from ground stations.

Each of the various radio systems, DME systems, transponder systems and ADS-B systems provide valuable information to the operator of the aircraft. Unfortunately, each system is deployed separately as each radio system requires its own receiver, its own transmitter, and its own antenna and each radio system operates at a specific frequency. This adds weight to the aircraft and requires additional space to house the multiple radios.

Accordingly, it is desirable to provide a method and apparatus for a multifunction radio. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment of the present invention a method for sending and receiving transmissions from multiple radio systems on a single radio comprises a first step of receiving a radio signal from one of the multiple radio systems. Next, the radio signal is converted to a digital signal. Then the digital signal is digitally downconverting. The digitally downconverted signal is processed to extract data from the radio signal.

A multifunction radio for receiving radio signals from and sending transmissions to multiple radio systems comprises an antenna and a transmit/receive switch coupled to the antenna. The radio further comprises a receiver section coupled to the transmit/receive switch and configured to receive radio signals from one or more multiple radio systems. The receiver section includes a digital downconverter configured to digitally downconvert radio signals sent from one or more of the multiple radio systems and a digital signal processor coupled to the digital downconverter for processing the downconverted signals. A transmitter section is coupled to the transmit/receive switch and configured to generate a transmission signal for reception by one or more of the multiple radio systems.

In yet another embodiment, a radio for receiving transmissions from and sending transmissions to multiple radio systems is disclosed. The radio comprises a receiver section configured to receive radio signals transmitted by one or more radio systems and to process the received radio signals using a digital downconverter having multiple channels corresponding to each of the multiple radio systems. The radio further includes a transmitter section configured to generate a transmission for each of the multiple radio systems. An antenna is selectively coupled to the receiver section and the transmitter section.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In the discussion below, the present invention is discussed as used in an avionics environment. However, the present invention is not limited to just one area of use and can be utilized to replace multiple radio systems with one radio in many different embodiments. These can include naval and terrestrial applications.

Figure 1:
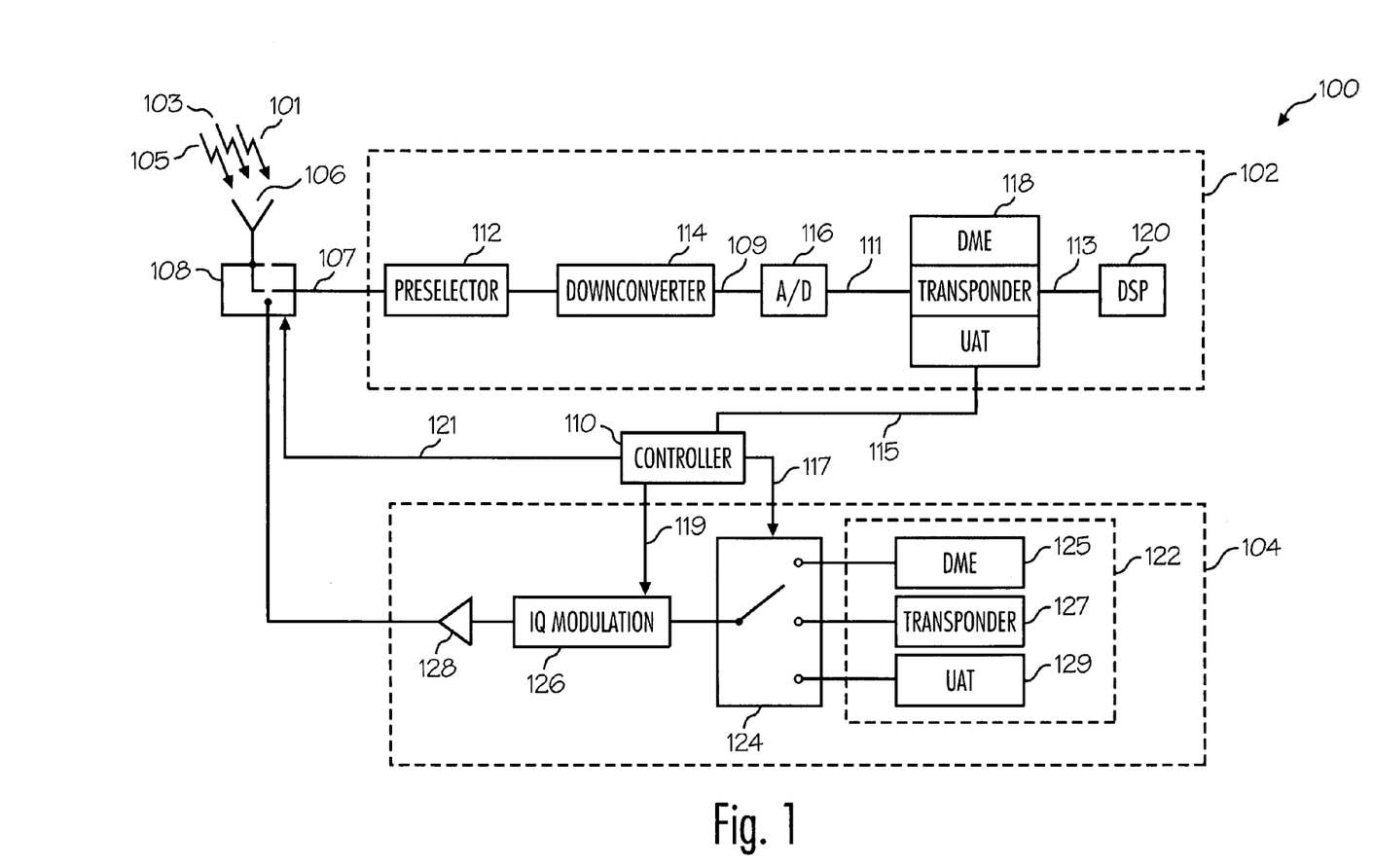
FIG. 1 is a block diagram of an exemplary embodiment of a multifunction radio in accordance with the teachings of the present invention.

FIG. 1 illustrates an exemplary embodiment of a multifunction radio 100 for receiving radio signals from and sending radio signals to one or more different radio systems in accordance with the teachings of the present invention. In the present invention, radio 100 transmits to and receives data from multiple radio systems by acting as, or emulating, multiple radios. The present invention, therefore, can replace multiple radios in an aircraft. In one embodiment, the different radio systems can comprise DME systems, transponder systems and ADS-B systems, such as UAT systems. Other radio systems can also communicate with multifunction radio 100. In one exemplary embodiment, multifunction radio 100 comprises a receiver section 102 and a transmitter section 104 coupled to a transmit/receive switch 108. An antenna 106 is coupled to the transmit/receive switch 108. A controller 110 couples to the receiver section 102, the transmitter section 104 and the transmit/receive switch 108.

Antenna 106 receives RF signals from at least one of several different sources such as DME signals 101, transponder signals 103 and UAT signals 105. As discussed previously, in one exemplary embodiment, DME signals 101 are sent and received in a frequency range of 978-1212 MHz, transponder signals 103 are sent at 1030 MHz and received at 1090 MHz and UAT signals 105 are sent and received at 978 MHz. Antenna 106 can be, in one exemplary embodiment, a single antenna for sending and receiving signals. Alternatively, multiple antennas in one or more groupings can be utilized.

Transmit/receive switch 108 switches the antenna 106 between the receiver section 102 and the transmitter section 104. In one exemplary embodiment, transmit/receive switch 108 receives a signal to switch the antenna 106 between the receiver section 102 and the transmitter section 104 via a switch control signal 121 supplied from the controller 110.

Controller 110 controls one or more switches or other devices in radio 100 based on control signals generated at a processor, such as a digital signal processor, discussed further below. Controller 110, in one exemplary embodiment, controls the operation of transmit/receive switch 108 via switch control signal 121.

Receiver section 102 receives RF signals 107 from at least one or more radio systems that can be emulated by radio 100 and extracts information from the received signals to obtain data and/or to generate a response. In one exemplary embodiment of the present invention, the receiver section 102 comprises a preselector filter 112 coupled to an analog downconverter 114, which, in turn, is coupled to an analog-to-digital (A/D) converter 116. The A/D converter 116 couples to a digital downconverter (DDC) 118, which, in turn, couples to a digital signal processor (DSP) 120.

Preselector filter 112 filters the received RF signal 107 to pass frequencies used by the radio systems that communicate with radio 100. In one exemplary embodiment, preselector filter 112 is a broadband band-pass filter that passes frequencies in the range of 978 MHz to 1212 MHz, while attenuating frequencies outside of that range. The frequency range can be adjusted based on the frequencies expected to be received by the radio 100 from the various radio systems emulated by the multifunction radio 100. The design of preselectors, such as preselector filter 112, is known in the art.

Analog downconverter 114 downconverts RF signal 107 received at antenna 106 and filtered by preselector filter 112 to an intermediate frequency (IF) signal 109 for further processing. Typically, analog downconverters, such as analog downconverter 114, include amplification stages, mixing stages and filtering stages and are well known in the art. In an exemplary embodiment, the analog downconverter 114 downconverts the received RF signal 107 by 966 MHz.

A/D converter 116 converts the IF signals 109 into digital signals 111. In one exemplary embodiment, A/D converter 116 is a high speed A/D converter that operates at 520 MHz. The digital signals 111 are supplied to the DDC 118.

DDC 118 downconverts the digital signal 111 to multiple baseband data streams via digital signal 113 for further processing. In one exemplary embodiment, DDC 118 includes multiple channels corresponding to each radio system emulated by multifunction radio 100 to downconvert digital signals 111 at different frequencies. For example, DDC 118 can include a channel for downconverting DME signals 101, a channel for downconverting transponder signals 103 and a channel for downconverting UAT signals 105. In one exemplary embodiment, DDC 118 can continuously downconvert each channel at the same time. The DDC 118 can receive a signal, downconvert the signal to a baseband digital signal 113 and isolate the desired frequency using a filter such as a programmable finite impulse response (FIR) filter using pulse shape filtering.

DSP 120 processes the baseband digital signal 113. In one exemplary embodiment, DSP 120 can decode received DME signals, transponder interrogations and UAT signals. DSP 120 can also generate responses to received signals or generate other transmissions. DSP 120 also provides data and control signals 115 to controller 110, the purpose of which is discussed further below. In one exemplary embodiment, DSP 120 is a hardware based DSP implemented using an application specific integrated circuit (ASIC), a field programmable gate array (FPGA) or similar circuit. Alternatively, the DSP 120 functions can be implemented as software running on a processor.

Transmitter section 104 generates messages to be sent to ground stations and/or other aircraft. Depending on the radio system, the message can be a reply to a received message or can be a message that is generated at the aircraft. For example, the message can be a reply signal generated in response to a transponder signal received by the radio 100. The message can also be a UAT signal or a DME signal. Transmitter section 104, in one exemplary embodiment, comprises frequency synthesizers 122 coupled to function controller 124. The output of the function controller 124 is coupled to an I/Q modulator 126, which in turn couples to an amplifier 128.

Frequency synthesizer 122 generates a waveform at a certain frequency. In an exemplary embodiment, there is at least one frequency synthesizer 122 for each radio system emulated by radio 100. For example, in one exemplary embodiment, there can be a DME frequency synthesizer 125 operating at a 1040-1150 MHz frequency range, a transponder frequency synthesizer 127 operating at a 1090 MHz frequency and an UAT frequency synthesizer 129 operating at a 978 MHz frequency. The frequency synthesizer 122 generates the frequency and outputs the synthesized frequency signals to function controller 124.

Function controller 124 selects which of the frequency synthesizers 122 will be used for transmission. Since the transmitter section 104 is preferably configured to transmit only one message at a time, the function controller 124 selects which frequency synthesizer 122 is to be used for transmission. The function controller 124 is coupled to the controller 110 which provides a function controller signal 117 to select the proper frequency synthesizer 122 to use for transmissions. As previously mentioned, the controller 110 also receives data and control information from the DSP 120 via a data and control signal 115. The control information indicates which frequency synthesizer 122 should be selected and when the frequency synthesizer 122 should be selected. The data, which represents the contents of the messages, provides an indication as to how to operate the function controller 124 to send messages that includes the required data.

I/Q modulator 126 modulates any of the synthesized signals that require modulation in order to encode data. For example, for a 978 MHz UAT signal, modulation of the inphase and quadrature signals is needed for the pulses to include the data sent in an UAT message. The modulation is controlled by the controller 110 using a modulation control signal 119, which receives the modulation information from the DSP 120. If the output of function controller 124 does not need modulation, it will pass through I/Q modulator 126.

Amplifier 128 amplifies the signals from I/Q modulator 126 for presentation to the antenna 106 for transmission. Amplifier 128 can be any amplifier capable of linearly amplifying the frequency range required by the radio 100. In one exemplary embodiment, amplifier 128 amplifies signals in a 978-1150 MHz range.

Figure 2:
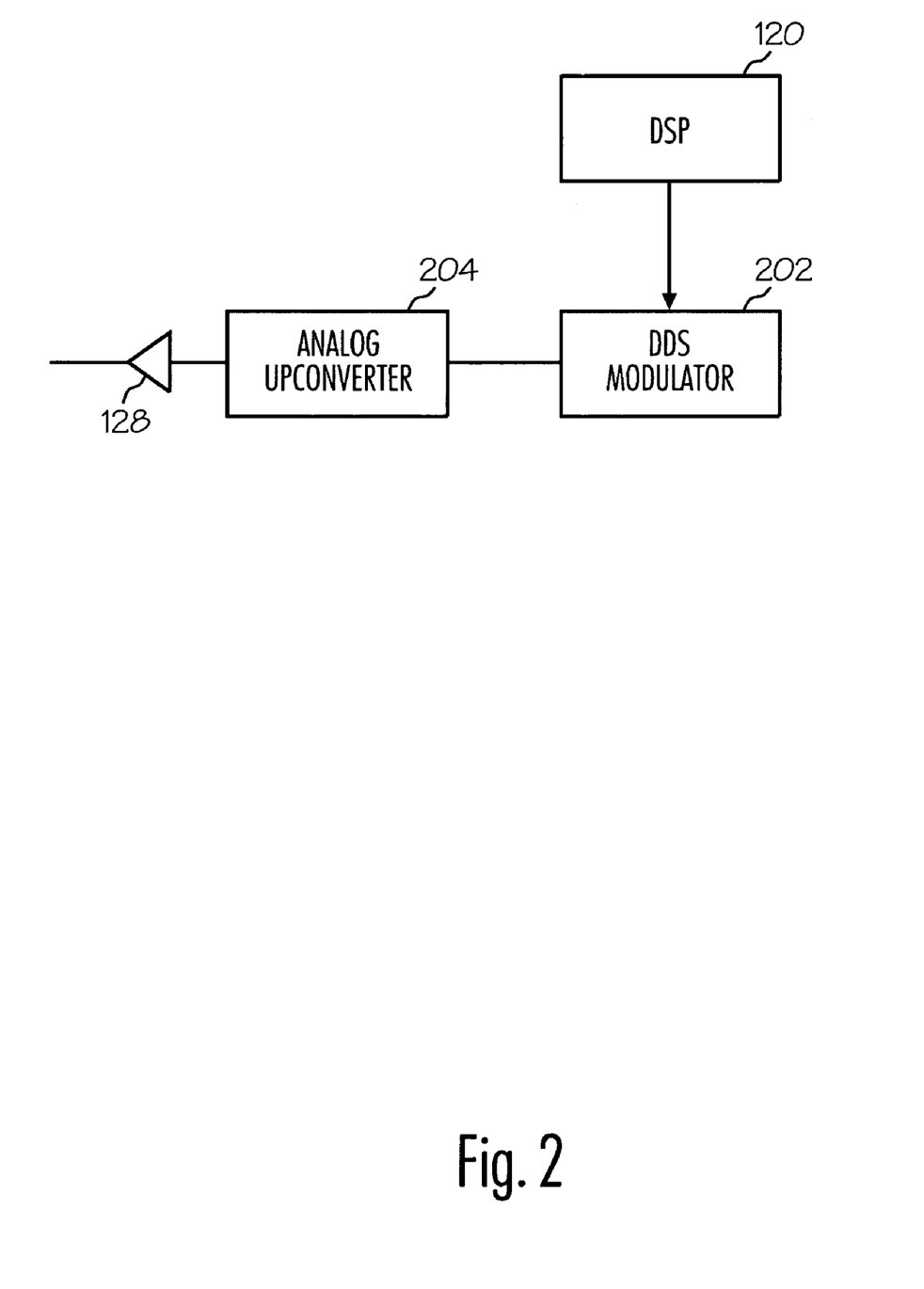
FIG. 2 is a block diagram of an alternative embodiment of a transmitter section in accordance with the teachings of the present invention.

FIG. 2 illustrates an alternative transmitter section 104. In FIG. 2, the transmitter section 104 comprises a DSP 120 coupled to a direct digital synthesizer 202, which is coupled to an analog upconverter 204 and an amplifier 128.

DSP 120 generates the messages to be transmitted by transmitter section 104. For example, DSP 120 can generate a response to a received interrogation. In one embodiment, the responses are a series of timed pulses at a fixed frequency. The DSP 120 determines the necessary frequency and the pulse timing needed to generate a response.

Direct digital synthesizer 202 creates waveforms at a set frequency based on received inputs. In one exemplary embodiment, direct digital synthesizer 202 receives the frequency to be used for responding to a received transmission as well as receiving the data of the message to be sent. As discussed previously, in some exemplary embodiments the data is sent as a series of timed pulses at a fixed frequency. In other exemplary embodiments the data is sent in a modulated waveform. For these embodiments, the direct digital synthesizer 202 can also perform modulations on any synthesized waveform.

Upconverter 204 is used to upconvert the frequency of the output signal of the direct digital synthesizer 202. The upconverted signal is then amplified by amplifier 128 for transmission by antenna 106. The upconversion process can be rendered unnecessary if the direct digital synthesizer 220 can run at a fast rate, such as 976-1150 MHz.

Figure 3:
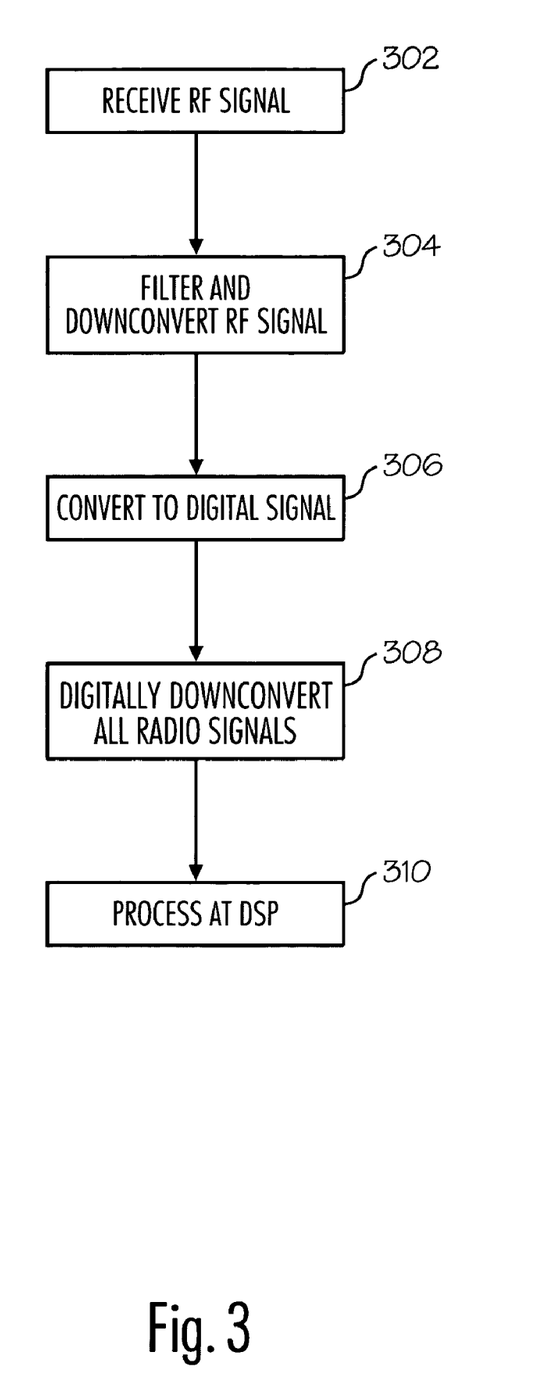
FIG. 3 is a flowchart of an exemplary method of operating a receiver section of a multifunction radio in accordance with the teachings of the present invention.

FIG. 3 is a flowchart illustrating a method of operating the multifunction radio 100 for receiving RF signals generated by one or more radio systems in accordance with the teachings of the present invention. In a first step, step 302, an RF signal is received at antenna 106. As discussed previously, radio 100 can receive RF signals from multiple radio systems. In one embodiment, the RF signals can be DME signals, transponder signals and/or ADS-B signals such as UAT signals.

Next, in step 304, the received RF signal 107 is filtered by preselector filter 112 and downconverted to an IF signal 109 via analog downconverter 114. In step 306, the IF signal 109 is converted to a digital signal 111 via A/D converter 116.

The digital signal 111 is then processed at the DDC 118 in step 308. In one exemplary embodiment, the digital signal 111 is downconverted by one of a plurality of channels in the DDC 118. Each channel corresponds to a frequency range of a radio system emulated by the radio 100. As discussed previously, in one exemplary embodiment, there can be a DME signal channel, a transponder signal channel and a UAT signal channel and the DDC 118 can process each channel continuously and simultaneously. As discussed previously, DDC 118 downconverts the digital signal 111 to a baseband for further processing in the DSP 120.

In step 310, the DSP 120 receives the downconverted digital signal and processes the signal to extract and process data and perform any additional calculations. For example, if the received signal is a DME transmission, DSP 120 could determine the time of arrival of the DME transmission and, based on when the original DME transmission was sent, calculate the distance to the ground station. If the received signal is a transponder signal, also known as an interrogation, the DSP 120 can recognize the signal as an interrogation and generate a reply. If the received signal is a UAT signal, the data in the signal is received and the data can be utilized by various other aircraft systems.

Figure 4:
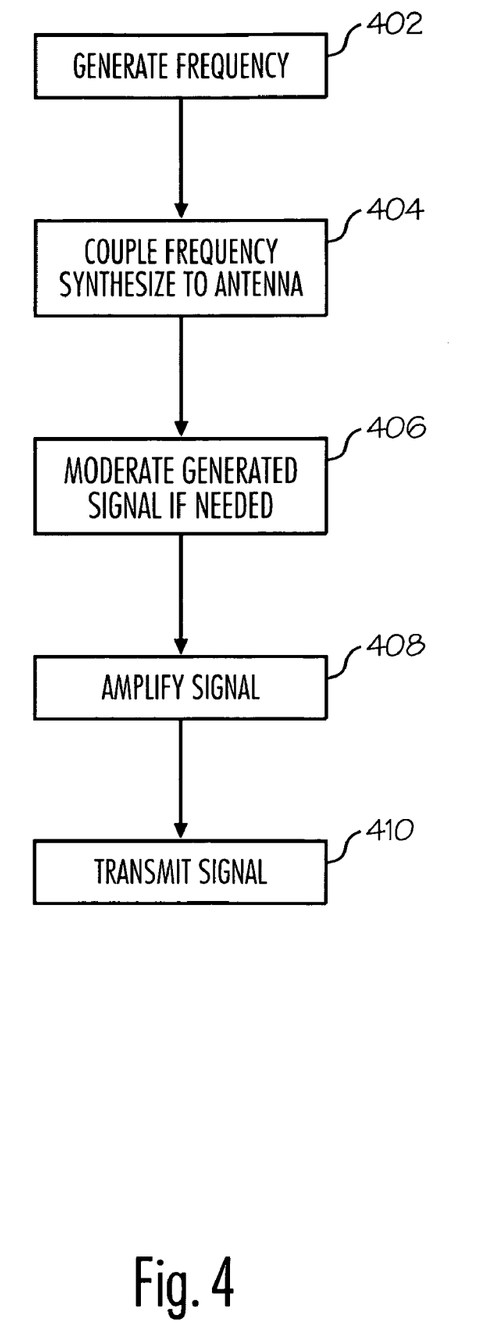
FIG. 4 is a flowchart of an exemplary method of operating a transmitter section of a multifunction radio in accordance with the teachings of the present invention.

FIG. 4 is a flowchart illustrating the operation of multifunction radio 100 for transmitting a signal in accordance with the teachings of the present invention. In a first step, step 402, one or more frequency synthesizers 122 generate a frequency used for transmissions for one or more radio systems emulated by multifunction radio 100. In one exemplary embodiment, the frequency synthesizer 122 includes a DME frequency synthesizer 125 that can synthesize a channel having a range of 1041-1150 MHz from the total range of 978-1212 MHz, a transponder frequency synthesizer 127 that can synthesize a 1090 MHz signal and a UAT frequency synthesizer 129 that can synthesize a 978 MHz signal.

In step 404, one of the frequency synthesizers 122 is coupled to the antenna 106 by function controller 124. Controller 110 sends the function controller signal 117 to function controller 124 to couple one of the synthesizers to antenna 106 for transmission. The sending of the function controller signal 117 is determined by data and control signals 115 sent by DSP 120. For example, in the case of transmitting a transponder reply that comprises a series of pulses separated in time, the function controller 124 couples the frequency synthesizer 122 to the antenna 106 for the length of each pulse and uncouples the frequency synthesizer 122 from the antenna 106 during periods of no signal in the series of pulses. Alternatively, the frequency synthesizer 122 can remain coupled to the antenna 106. The I/Q modulator 126 can supply the necessary modulation.

In step 406, the signal generated by the frequency synthesizer 122 and the function controller 124 are modulated by the I/Q modulator 126 if needed. For example, in one embodiment, UAT signals are constant phase frequency shift keying (CPFSK) modulated signals. Thus, the UAT frequency signal generated by the frequency synthesizer 122 is modulated by the I/Q modulator 126. The modulation is controlled by controller 110 based on data and control signals 115 sent by the DSP 120.

In step 408, any processing needed before transmission is done, such as signal amplification. In step 410, the signal is transmitted via antenna 106. The transmit/receive switch 108 is placed in the transmission position via the switch control signal 121 from controller 110.

Figure 5:
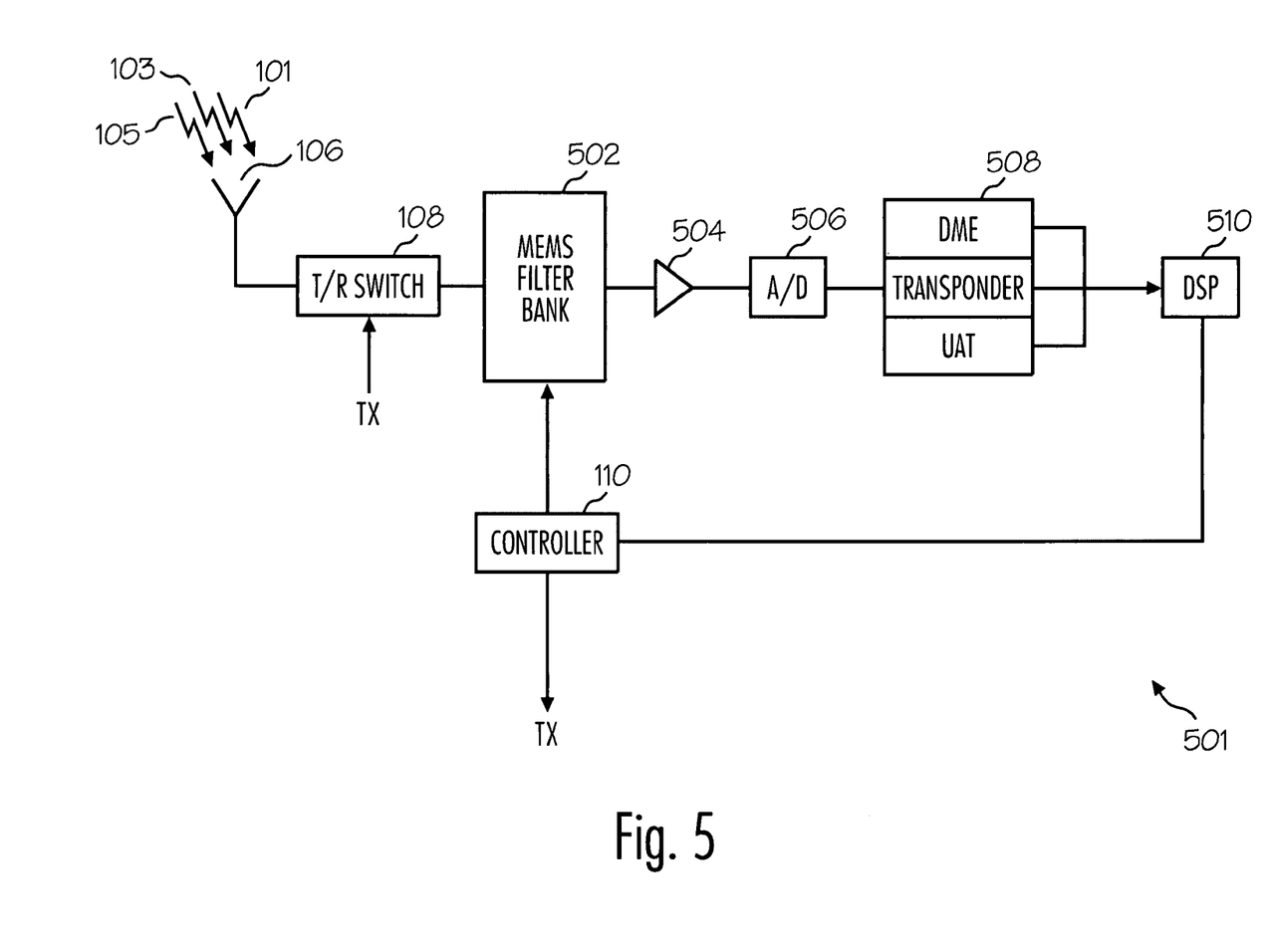
FIG. 5 is a block diagram of an exemplary embodiment of a receiver section in accordance with the teachings of the present invention.

FIG. 5 illustrates an alternative receiver section 501 for radio 100 in accordance with the teachings of the present invention. Receiver section 501 comprises an antenna 106 coupled to a transmit/receive switch 108. Transmit/receive switch 108 in turn is coupled to a filter bank 502, which is coupled to an amplifier 504 which in turn couples to an A/D converter 506. The output of the A/D converter 506 is sent to a digital downconverter 508. The digitally downconverted output of the digital downconverter 508 is received for further processing at a digital signal processor (DSP) 510. A controller 512 is coupled to the filter bank 502 and the DSP 510.

Antenna 106, as discussed previously, receives the output of broadcasted RF signals from several sources such as DME signals 101, transponder signals 103 and UAT signals 105. As discussed previously, DME signals 101 are sent at a frequency of 978-1212 MHz, transponder signals 103 (the interrogation signal) are sent at 1030 MHz and UAT signals 105 are received at 978 MHz. Antenna 106, in one embodiment, is a single antenna, although multiple antennas in one or more groupings can be used.

Transmit/receive switch 108 switches the antenna 106 between the transmitter and the receiver. In one exemplary embodiment, transmit/receive switch 108 receives a switch control signal to switch from receive to transmit and vice-versa. Transmit/receive switch 108 can be any such switch that can switch antennas using both the transmitter and receiver.

Filter bank 502 filters received RF signals 107 in the frequency range used by the filter. In an exemplary embodiment where receiver section 501 receives DME signals 101, transponder signals 103 and UAT signals 105, filter bank 502 can filter one or more channels in the DME frequency range of 978-1212 MHz, the 1030 MHz signal of the transponder system and the 978 MHz signal of the UAT system. In one embodiment, the filter bank 502 filters the entire received RF signal 107 for each of the frequency ranges. Alternatively, filtering elements in the filter banks 502 can be activated via a controller 512 to select a central frequency and a frequency range that is filtered by filter bank 502. While filter banks 502 is shown with three banks for filtering DME signals, transponder signals and UAT signals, additional and/or different banks can be present in the filter banks 502. In one embodiment, filter banks 502 can be a microelectronic mechanical system (MEMS) filter bank, although, filter banks 502 fabricated using non-MEMs techniques can be used.

Amplifier 504 amplifies the filtered output of the filter bank 502. A/D converter 506 converts the filtered analog RF signals to digital signals for further processing. In one embodiment, A/D converter 506 is a high speed A/D converter operated around 488 MHz. A/D converter 506 can be of any conventional design. In this example, the A/D converter 506 undersamples the RF signal such that analog downconversion is not needed. If the A/D converter 506 is not a high speed converter, undersampling can not be performed.

Digital downconverter 508 downconverts a digital signal received from the A/D converter 506 for further processing in receiver section 501. The digital downconverter 508 can include channels for each radio system emulated by radio 100. For example, the digital downconverter 508 can include a channel for downconverting the DME signal 101, the transponder signal 103 and the UAT signal 105. Digital downconverter 508, for each channel, downconverts the signal to a baseband and isolates the desired frequency through filtering, such as pulse shape filtering using a programmable FIR filter.

DSP 510 performs any necessary demodulation and signal processing on received digitized signals. For example, DSP 510 can decode an interrogation from a DME transmitter or an UAT transmitter. DSP 510 can be a hardware or software DSP. DSP 510 can be selected from any suitable DSP known in the art.

Controller 512 couples to the DSP 510 and receives instructions 511 from the DSP 510 to control the filter bank 502. As discussed previously, controller 512 can set the central frequency and bandwidth of the filter bank.

In one exemplary embodiment of FIG. 5, analog downconversion is not needed because of either the use of high frequency A/D converter 506 (256 Hz) or through the use of very high quality (high Q value) filters, such as the MEMS filter in the filter bank 502. This allows for undersampling in the A/D converter 506, eliminating the need for analog downconversion.

Figure 6:
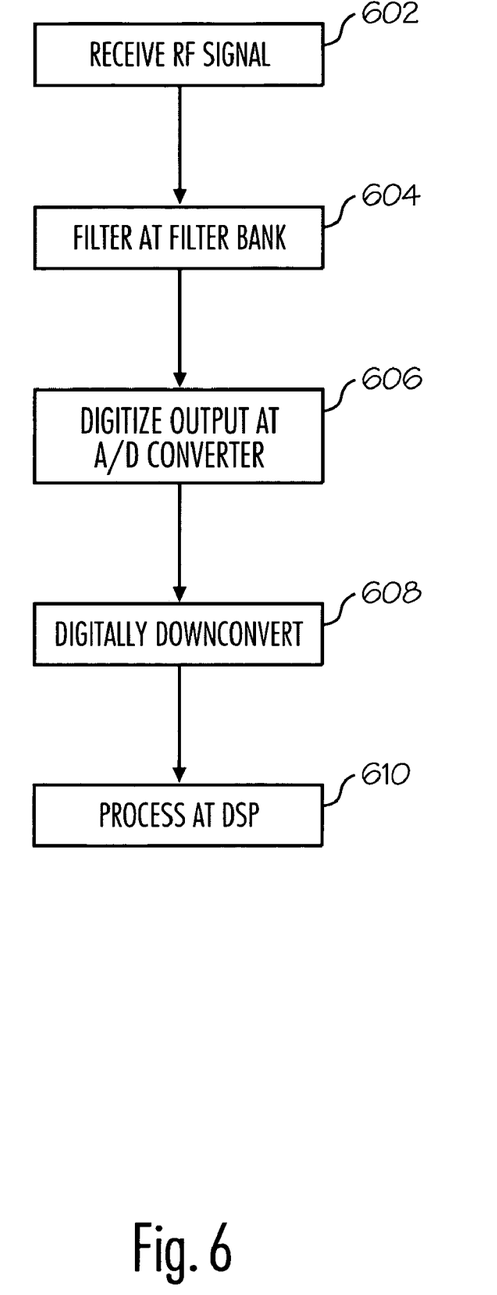
FIG. 6 is a flowchart of an exemplary method of operating a receiver section in accordance with the teachings of the present invention.

FIG. 6 is a flowchart illustrating an exemplary operation of receiver section 501. In a first step, step 602, one or more RF signals 107 are received at antenna 106. As discussed previously, the RF signals may include DME signals 101, transponder signals 103 and/or ADS-B signals, such as UAT signals 105.

Next, in step 604, the received signal passes through filter bank 502. Since this discussion is on receiving a signal, the transmit/receive switch 108 is selected to receive. The filter bank 502 filters the received signal using banks and filters selected by controller 512. For example, if the received signal is an interrogation, the filter bank 502 would be set to filter the received signal through the transponder filter, which, in an exemplary embodiment, will filter at 1030 MHz.

In the next step, step 606, the output of the filter bank 502 is digitized by A/D converter 506. A/D converter 506 uses a high sample-rate (high speed) sampler. In one embodiment, the A/D converter 506 operates at 488 MHz. In this embodiment, the signals are undersampled such that the DME signal appears to be at 128 MHz, the transponder signal at 54 MHz and the UAT signal at 2 MHz.

In step 608, the digital downconverter 508 digitally downconverts the 128/54/2 MHz digital signals to baseband for processing. As discussed previously, digital downconverter 508 downconverts and filters received digital signals such that the signal can be further processed.

In step 610, the downconverted signal is processed at DSP 510. DSP 510 interprets the received signal and, if needed, generates a reply. For example, if the original received signal was an interrogation pulse in the transponder system, the DSP 510 would recognize the transmission as a transponder pulse, determine the appropriate response and generate the reply.

Figure 7:
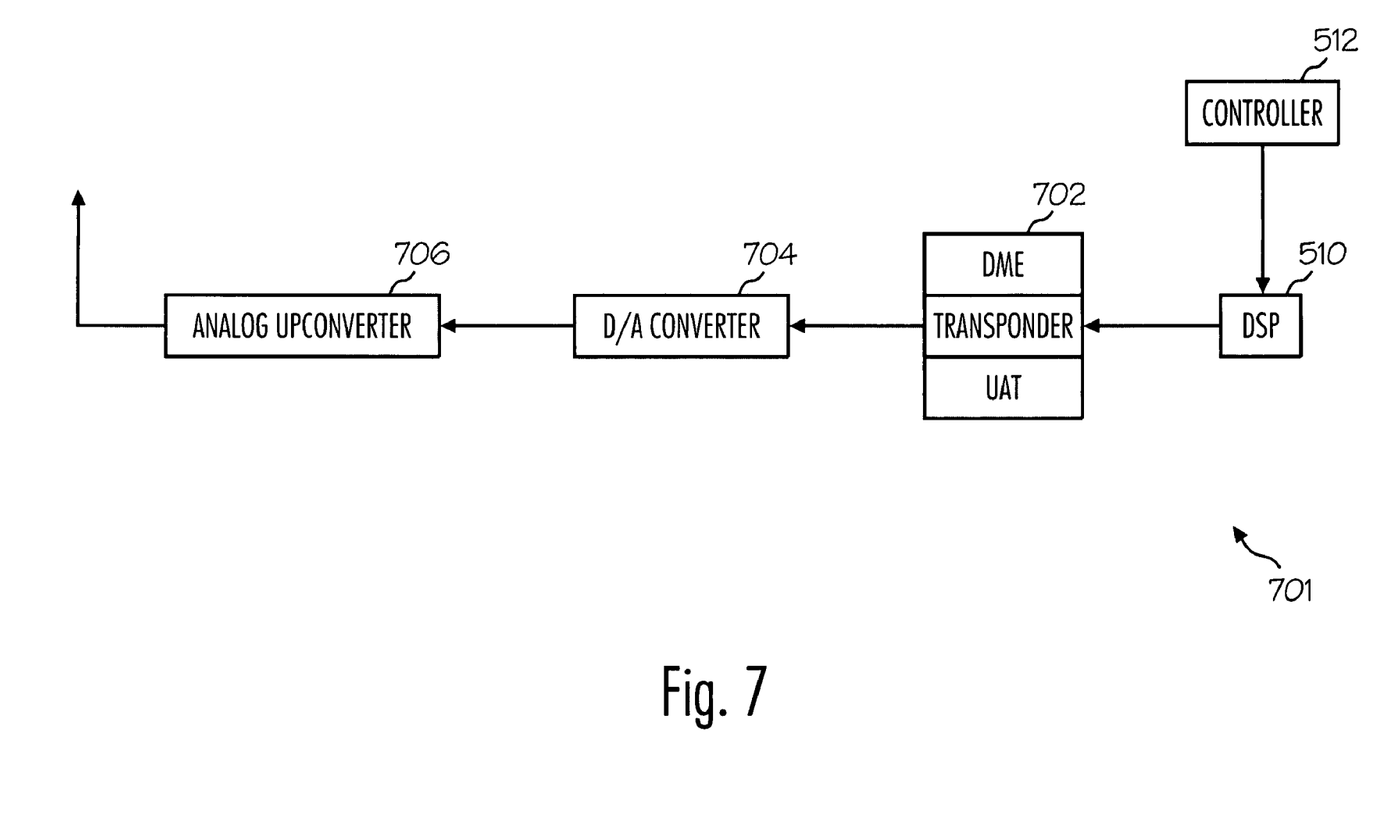
FIG. 7 is a block diagram of an exemplary embodiment of a transmitter section in accordance with the teachings of the present invention.

FIG. 7 is a block diagram of an alternative transmitter section 701 in accordance with the teachings of the present invention. Transmitter section 701 comprises DSP 510 coupled to a digital upconverter 702. The digital upconverter 702 is coupled to a digital to analog (D/A) converter 704, which is coupled to an analog front end 706. Analog front end 706 couples to the transmit/receive switch 108 and the antenna 106.

DSP 510 is, in one embodiment, shared with receiver section 501, although the transmitter section 104 can include a dedicated DSP. DSP 510 generates the digital data that comprises responses (replies) to transponders, as well as broadcasts for ADS-B systems and DME systems. For example, in response to an interrogation from a ground station in an ATCRBS system, the DSP 510 may generate a reply including aircraft identification encoded as a series of pulses.

Digital upconverter 702 receives the digital data generated by the DSP 510 as a baseband signal. In one exemplary embodiment, digital upconverter 702 then digitally upconverts the baseband signal for the DME signal to 71 MHz for a RF signal of 1150 MHz and 8 MHz for the 978 MHz UAT signal. Digital upconverter 702 also performs any received signal filtering and other signal processing needed to produce the digitized baseband signal.

D/A converter 704 receives digitized signals to produce analog signals. In one exemplary embodiment, D/A converter 704 has a high sampling rate of 400 MHz. D/A converter 704 can be selected from any number of suitable D/A converters that are known in the art.

Analog front end 706 receives analog signals and prepares the signal for transmission. In one exemplary embodiment, the analog front end 706 upconverts the baseband signal received from the D/A converter 704 to an appropriate RF signal. In one exemplary embodiment, a mixer (not pictured) and a local oscillator (not pictured) operating at 978 MHz are used to upconvert the baseband signal. Analog front end 706 can also include a filtering system to filter out any signals beyond those used by the radio 100 and any amplification necessary to transmit the signal When transmitting a signal, the transmit/receive switch 108 is set to transmit. The signal is transmitted over the antenna 106. As discussed previously, antenna 106 can be a single antenna, a single grouping of antennas or multiple groupings of antennas.

Figure 8:
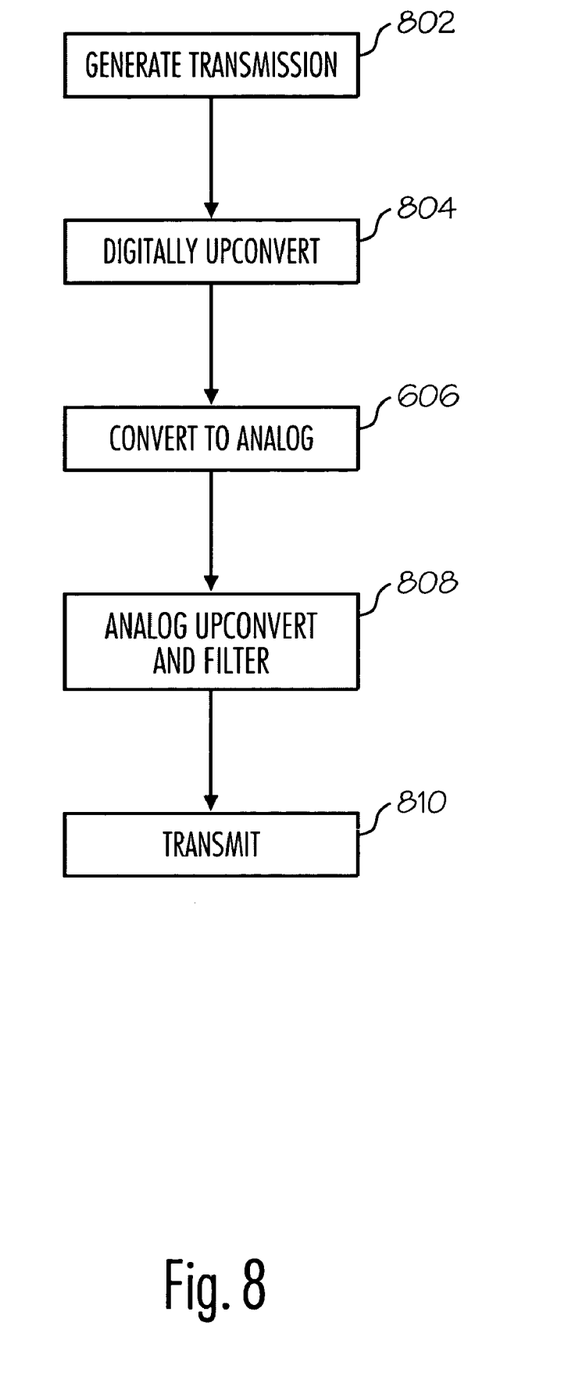
FIG. 8 is a flowchart of an exemplary method of operating a transmitter section in accordance with the teachings of the present invention.

FIG. 8 is a flowchart illustrating an exemplary embodiment of the operation of transmitter section 104 in accordance with the teachings of the present invention. In a first step, step 802, a transmission of digital data is generated by the DSP 510. In one exemplary embodiment, the transmission can be a reply to an interrogation, a DME transmission and/or an ADS-B transmission, such as an UAT transmission.

In step 804, the digital data is upconverted by digital upconverter 702. Digital upconverter 702 converts the digital data generated by the DSP 510 to digital intermediate frequency (IF) signals. Digital upconverter 702 also provides any necessary filtering.

The digitized baseband signal is converted to an analog signal at D/A converter 704, in step 806. As discussed previously, D/A converter 704 is a high speed D/A converter. In step 806, the analog signal is upconverted, filtered and amplified for transmission. In step 808, the signal is transmitted via antenna 106.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for sending and receiving transmissions from multiple radio systems on a single radio comprising:
   receiving a radio signal from at least one of the multiple radio systems;
   filtering the radio signal through a filter having a bandpass frequency range covering the multiple radio systems to provide a filtered radio signal;
   converting the filtered radio signal to a digital signal;
   digitally downconverting the digital signal to produce a digitally downconverted signal; and
   processing the digitally downconverted signal.

2. The method of claim 1 further comprising the step of:
   generating a transmission comprising data to be sent to one of the multiple of radio systems;
   digitally upconverting the transmission to form a digital transmission;
   converting the digital transmission to an analog transmission;
   performing front end processing on the analog transmission to upconvert the analog transmission to a RF signal transmission; and
   sending the RF signal transmission.

3. The method of claim 1 wherein the step of receiving a radio signal further comprises receiving a radio signal from a DME ground station.

4. The method of claim 1 wherein the step of receiving a radio signal further comprises receiving a radio signal from a transponder system.

5. The method of claim 1 wherein the step of receiving a radio signal further comprises receiving a radio signal from an ADS-B system.

6. The method of claim 1 wherein the step of receiving a signal from an ADS-B system further comprises receiving a signal from an UAT system.

7. The method of claim 1 wherein the step of filtering the radio signal further comprises filtering the radio signal using filter banks selected from a plurality of filtering banks.

8. The method of claim 1 wherein the step of filtering the radio signal further comprises filtering the radio signal using a broadband preselector.

9. The method of claim 1 further comprising the steps of:
   generating a waveform of a fixed frequency;
   coupling the waveform to the antenna under the control of a controller to produce a transmission signal;
   modulating the transmission signal if needed; and
   sending the transmission signal from the antenna.

10. The method of claim 1 wherein the step of digitally downconverting the digital signal further comprises downconverting the digital signal using a channel of a digital downconverter configured to downconvert radio signals from a specific radio system.

11. A multifunction radio for receiving radio signals from and sending transmissions to multiple radio systems, the radio comprising:

an antenna;

a transmit/receive switch coupled to the antenna;

a receiver section coupled to the transmit/receive switch and configured to receive radio signals from the multiple radio systems; the receiver section comprising:

a digital downconverter configured to digitally downconvert the radio signals to produce a digitally downconverted signal; and a digital signal processor coupled to the digital downconverter for processing the digitally downconverted signals; and a transmitter section coupled to the transmit/receive switch and configured to generate a transmission signal for reception by the multiple radio systems.

12. The radio of claim 11 wherein the transmitter section comprises:

a frequency synthesizer configured to generate a waveform at a fixed frequency; and a function controller configured to couple the waveform of the frequency synthesizer to the antenna.

13. The radio of claim 12 further comprising an optional modulator coupled between the antenna and the function controller for modulating the waveform if necessary.

14. The radio of claim 11 wherein the transmitter section further comprises:

a direct digital synthesizer for producing a fixed frequency waveform; and an upconverter coupled to the direct digital synthesizer, the upconverter configured to upconvert the fixed frequency waveform for transmission.

15. The radio of claim 11 wherein the transmitter section further comprises:

a processor configured to generate a transmission signal;

a digital upconverter coupled to the processor, the digital upconverter configured to produce a digitally upconverted signal of the generated transmission signal;

a digital-to-analog converter coupled to the digital upconverter, the digital-to-analog converter configured to convert the upconverted signal to an analog signal; and an analog upconverter coupled to the digital-to-analog converter, the analog upconverter configured to upconvert the analog signal.

16. The radio of claim 11 further comprising a controller coupling the receiver section, the transmitter section and the transmit/receive switch, the controller configured to switch the transmit/receive switch to couple either the receiver section or the transmitter section to the antenna.

17. The radio system of claim 11 wherein the receiver section further comprises:

a preselector filter coupled to the antenna, the preselector configured to pass a frequency range corresponding to the range frequency of radio signals transmitted by the multiple radio systems;

a downconverter coupled to the preselector, the downconverter configured to downconvert the radio signal to an intermediate frequency radio signal; and an analog-to-digital converter coupled to the downconverter, the analog-to-digital converter configured to convert the intermediate frequency radio signal to a digital signal for processing by the digital downconverter.

18. The radio system of claim 11 wherein the receiver system further comprises a filter bank configured to be tunable to a set frequency and frequency range, the filter bank coupled as an input to the digital downconverter.

19. A radio for receiving transmissions from and sending transmissions to multiple radio systems, the radio comprising:

a receiver section configured to receive radio signals transmitted by one or more radio systems and process the received radio signals in a digital downconverter having multiple channels corresponding to each of the multiple radio systems;

a transmitter section configured to generate a transmission for each of the multiple radio systems; and an antenna selectively coupled to the receiver section and the transmitter section.

20. The radio of claim 19 wherein the radio systems is selected from a group comprising a DME radio system, a transponder radio system and an ADS-B radio system.

* * * * *